United States Patent [19]

Kasahara et al.

[11] Patent Number: 5,374,484
[45] Date of Patent: Dec. 20, 1994

[54] FLUORINE-CONTAINING ELASTOMER COMPOSITION AND MOLDED ARTICLES MADE THEREFROM

[75] Inventors: Michio Kasahara, Nobeoka; Yukihiro Ikeda, Higashiusuki, both of Japan

[73] Assignee: Asahi Kasei Kogyo Kabshiki Kaisha, Osaka, Japan

[21] Appl. No.: 94,180

[22] PCT Filed: Apr. 27, 1993

[86] PCT No.: PCT/JP93/00550

§ 371 Date: Aug. 6, 1993

§ 102(e) Date: Aug. 6, 1993

[87] PCT Pub. No.: WO93/23469

PCT Pub. Date: Nov. 25, 1993

[30] Foreign Application Priority Data

May 11, 1992 [JP] Japan ................... 4-117267
Sep. 22, 1992 [JP] Japan ................... 4-252700

[51] Int. Cl.$^5$ .......................................... B32B 27/00
[52] U.S. Cl. ................... 428/421; 428/422; 524/399; 524/529; 524/530
[58] Field of Search ............... 524/399, 529, 530; 428/421, 422

[56] References Cited

U.S. PATENT DOCUMENTS

| | | | |
|---|---|---|---|
| 4,243,770 | 1/1981 | Tatemoto et al. . | |
| 4,286,655 | 11/1988 | Nakagawa et al. | 524/570 |
| 4,299,759 | 11/1981 | Miyata et al. | 524/424 |
| 4,427,816 | 1/1984 | Aoki et al. | 524/424 |
| 4,558,102 | 12/1985 | Miyata . | |
| 4,704,423 | 11/1987 | Iwanami et al. | 524/417 |
| 4,729,854 | 3/1988 | Miyata et al. | 524/427 |
| 4,861,816 | 8/1989 | Kobayashi et al. | 524/399 |
| 4,943,622 | 6/1990 | Naraki et al. . | |
| 4,963,608 | 10/1990 | Kumida et al. | 524/399 |
| 5,141,980 | 8/1992 | Ranceze et al. | 524/399 |
| 5,252,645 | 10/1993 | Nosu et al. | 524/399 |

FOREIGN PATENT DOCUMENTS

| | | |
|---|---|---|
| 58222128 | 12/1958 | Japan . |
| 60-18535 | 1/1985 | Japan . |
| 63-30400 | 9/1988 | Japan . |
| 340786 | 8/1989 | Japan . |
| 216140 | 1/1990 | Japan . |
| 356545 | 3/1991 | Japan . |
| 3122153 | 5/1991 | Japan . |
| 5287150 | 4/1992 | Japan . |
| 370759 | 3/1993 | Japan . |

*Primary Examiner*—Bernard Lipman
*Attorney, Agent, or Firm*—Birch, Stewart, Kolasch & Birch

[57] ABSTRACT

A fluorine-containing elastomer composition consists essentially of (A) a peroxide-vulcanizable fluorine-containing elastomer containing iodine and/or bromine which becomes a vulcanizing point, (B) an organic peroxide, (C) a co-vulcanizing agent and (D) a hydrotalcite compound or a calcined product thereof.

The composition of the present invention is markedly improved in permanent compression set and adhesion after vulcanization while maintaining excellent tensile characteristics, heat resistance and chemical resistance corresponding to those of conventionally known peroxide-vulcanizable fluorine-containing elastomer, and therefore is suitable for the uses such as an O-ring, a gasket and an oil seal.

43 Claims, No Drawings

FLUORINE-CONTAINING ELASTOMER COMPOSITION AND MOLDED ARTICLES MADE THEREFROM

TECHNICAL FIELD

The present invention relates to a novel fluorine-containing elastomer composition and a molded article made therefrom.

More specifically, the present invention relates to a fluorine-containing elastomer composition improved in permanent compression set and adhesion after vulcanization while maintaining excellent tensile characteristics, heat resistance and chemical resistance corresponding to those of conventionally known peroxide-vulcanized fluorine-containing elastomer compositions, a molded article available from the composition, and a laminate comprising a metal, a resin, an elastomer or a fiber and a cured product of said composition which are laminated with an adhesive cured by vulcanization.

BACKGROUND ART

In general, fluorine-containing elastomers are superior in heat resistance and oil resistance and are used in various industrial fields such as general machine industry, industry relating to antipollution technique, automobile industry, shipping industry, aircraft industry and hydraulic machine industry. Especially, since the fluorine-containing elastomers which are subjected to vulcanization with peroxides are markedly excellent in chemical resistance, they are used in the field of sealing lubricating oils containing a large amount of additives and further used where they directly contact with acids or bases.

However, when the fluorine-containing elastomers which are subjected to vulcanization with peroxides are compared with polyol-vulcanizable fluorine-containing elastomers which are subjected to vulcanization with aromatic polyol compounds which are mainly used nowadays, the former are inferior in permanent compression set which is an indication of sealability. Furthermore, they generate halogen compounds originating from the vulcanizing point of the compositions at the time of vulcanization molding which causes deterioration of adhesives. Therefore, no product having strong adhesion can be obtained and defective moldings result. Thus, the peroxide-vulcanizable fluorine-containing elastomers are limited in their use although they have excellent properties.

DISCLOSURE OF INVENTION

The purpose of the present invention is to provide a fluorine-containing elastomer composition improved in permanent compression set and adhesion after vulcanization while maintaining excellent tensile characteristics, heat resistance and chemical resistance corresponding to those of conventionally known peroxide-vulcanizable fluorine-containing elastomer compositions, a molded article available from the composition, and a laminate comprising a metal, a resin, an elastomer or a fiber and a cured product of said composition which are laminated with an adhesive cured by vulcanization.

As a result of intensive research conducted by the inventors, it has been found that the above purpose can be satisfied with a composition comprising a specific fluorine-containing elastomer which is peroxide-vulcanizable and further an organic peroxide, a co-vulcanizing agent and a hydrotalcite compound. Thus, the present invention has been accomplished.

That is, the present invention provides a fluorine-containing elastomer composition comprising (A) a peroxide-vulcanizable fluorine-containing elastomer containing iodine and/or bromine which serve as a vulcanizing point, (B) an organic peroxide, (C) a co-vulcanizing agent and (D) a hydrotalcite compound or a calcined product thereof; a molded article obtained from the composition; and a laminate comprising a metal, a resin, an elastomer or a fiber and a cured product of said composition which are laminated with an adhesive cured by vulcanization.

BEST MODE FOR CARRYING OUT THE INVENTION

The present invention is explained in detail below.

The component (A) in the present invention includes fluorine-containing elastomers comprising (a) a vinylidene fluoride unit (hereinafter referred to as "VdF unit") and (b) a hexafluoropropylene unit (hereinafter referred to as "HFP unit") and optionally (c) a tetrafluoroethylene unit (hereinafter referred to as "TFE unit"), fluorine-containing elastomers comprising VdF unit, a perfluoroalkyl perfluorovinyl ether unit (hereinafter referred to as "PFAVE unit") and TFE unit and fluorine-containing elastomers comprising PFAVE unit and TFE unit.

In order to carry out vulcanization with a peroxide, it is preferred that the fluorine-containing elastomer contains 0.001 to 10% by weight of iodine and/or bromine bonded in the elastomer.

The component (A) which is especially preferable is a fluorine-containing elastomer which comprises (a) VdF unit and (b) HFP unit and optionally (c) TFE unit in an amount of 35 to 0% by weight based on the total weight of the monomer units (a), (b) and (c), and contains 0.001 to 10% by weight of iodine and/or bromine bonded in the polymer, the weight ratio of the VdF unit (a) and the HFP unit (b) being in the range of 40:60 to 80:20.

The content of iodine and/or bromine bonded in the fluorine-containing elastomer is in the range of 0.001 to 10% by weight, since when it is lower than 0.001% by weight, sufficient crosslinking density cannot be obtained and permanent compression set is inferior, and when it is higher than 10% by weight, the crosslinking density is too high and elasticity of the elastomer is lost. The content of iodine and/or bromine is especially preferably in the range of 0.005 to 5% by weight.

Introduction of iodine capable of becoming a vulcanizing point into the end of the polymeric molecular chain can be effectively attained by using an iodine compound as a chain transfer agent (U.S. Pat. No. 4,243,770 and Japanese Patent Publication Unexamined No. 60('85)-221409, etc.).

For introduction of bromine capable of becoming a vulcanizing point, for example, a method for carrying out copolymerization with bromine-containing monomer units such as bromotrifluoroethylene, 4-bromo-3,3,4,4-tetrafluorobutene-1 and brominated fluorovinyl ether (U.S. Pat. Nos. 4,035,565, 4,564,662, 4,745,165, etc.), a method for carrying out the polymerization in the presence of a bromine compound (U.S. Pat. No. 4,501,869), etc. are enumerated.

Furthermore, for introduction of iodine and bromine as vulcanizing points, a method for preparing the elastomer in the presence of an iodine and bromine-containing compound (Japanese Patent Publication Examined No. 1('89)-16845 and U.S. Pat. Nos. 4,748,223, 4,943,622, 5,151,492, etc.), a method for carrying out copolymerization of a bromine-containing monomer unit in the presence of an iodide of an alkali metal or an alkaline earth metal (U.S. Pat. No. 5,173,553), a method for carrying out copolymerization of a bromine-containing monomer unit in the presence of an iodinated compound (U.S. Pat. Nos. 5,032,655, 5,077,359, 4,948,853, etc.), and the like are enumerated.

The component (A) may be used as a blend of two or more.

Mooney viscosity $ML_{1+10}$ (121° C.) of the component (A) is preferably in the range of 1 to 200, since when the viscosity is lower than 1, a sufficient crosslinking density cannot be obtained and when the viscosity is higher than 200, mixing by open mill rolls or closed mill rolls (such as Banbury mixer and a pressure kneader) is difficult. $ML_{1+10}$ (121° C.) is especially preferably in the range of 5 to 120.

Commercially available component (A) includes the following.

"DAI-EL G-801" (manufactured by Daikin Kogyo Co., Ltd.) comprising VdF unit/HFP unit and containing iodine which is to be a vulcanizing point.

"DAI-EL G-901", "DAI-EL G-902", "DAI-EL G-912", "DAI-EL G-952", and "DAI-EL G-1001" manufactured by Daikin Kogyo Co., Ltd. and "MIRAFLON FR-6140", "MIRAFLON FR-6340", "MIRAFLON FR-6150", "MIRAFLON FR-6350" and "MIRAFLON FR-6360" manufactured by Asahi Kasei Kogyo K. K. comprising VdF unit/HFP unit/TFE unit and containing iodine which is to be a vulcanizing point.

"VITON GF", "VITON VTR-5927" and "VITON VTR-6510" manufactured by E. I. Du Pont de Nemours, and Company, "FLUOREL FLS-2960" manufactured by Minnesota Mining and Manufacturing Company, and "TECHNOFLON P 2 " and "TECHNOFLON P 40" manufactured by Montedison S.P.A. which comprise VdF unit/HFP unit/TFE units/monomer unit having a bromine-containing vulcanizing point (hereinafter referred to as "BCSM unit").

"VITON GLT" and "VITON GFLT" manufactured by E. I. Du Pont de Nemours, and Company which comprise VdF unit/perfluoromethyl perfluorovinyl ether unit (hereinafter referred to as "PFMVE unit")/TFE unit/BCSM unit.

"DAI-EL PERFLUOR" (manufactured by Daikin Kogyo Co., Ltd.) comprising PFAVE unit/TFE unit and iodine which is to be a vulcanizing point.

As the organic peroxide of (B) component, organic peroxides which generates peroxide radicals under vulcanizing conditions are used, and examples of the organic peroxide include 1,1-bis(tert-butylperoxy)-3,5,5-trimethylcyclohexane, 1,1-bis(tert-butylperoxy)cyclohexane, 2,2-bis(tert-butylperoxy)octane, n-butyl-4,4-bis(tert-butylperoxy)valerate, 2,2-bis(tert-butylperoxy)butane, 2,5-dimethylhexane-2,5-dihydroxy peroxide, di-tert-butyl peroxide, tert-butylcumyl peroxide, dicumyl peroxide, α,α'-bis(tert-butylperoxy-m-isopropyl)benzene, 2,5-dimethyl-2,5-di(tert-butylperoxy)hexane, 2,5-dimethyl-2,5-di(tert-butylperoxy)hexyne-3, benzoyl peroxide, tert-butylperoxybenzene, 2,5-dimethyl-2,5-di(benzoylperoxy)hexane, tert-butylperoxymaleic acid, and tert-butyl-oxyisoproplyl carbonate. Especially preferred peroxides are 2,5-dimethyl-2,5-di(tert-butylperoxy)hexane, dicumyl peroxide and α,α'-bis(tert-butylperoxy-m-isopropyl)benzene.

The blending proportion of the component (B) is preferably 0.05 to 5 parts by weight per 100 parts by weight of the component (A) since when the proportion is lower than 0.05 part by weight, a sufficient vulcanizing rate cannot be obtained and mold releasability deteriorates and when the proportion is higher than 5 parts by weight, permanent compression set markedly deteriorates. Especially preferred proportion of the component (B) is 0.1 to 3 parts by weight.

The component (C) is a co-vulcanizing agent comprising a poly-unsaturated compound which enhances the properties of vulcanized products in combination with the organic peroxide. Examples of the component (C) include triallyl cyanurate, trimethally isocyanurate, triallyl isocyanurate, triacrylformal, triallyl trimellitate, N,N'-m-phenylenebismaleimide, diallyl phthalate, tetrallylterephthalamide, tris(diallylamine)-s-triazine, triallyl phosphite and N,N-diallylacrylamide. Especially preferred is triallyl isocyanurate.

Blending proportion of the component (C) is preferably 0.1 to 10 parts by weight per 100 parts by weight of the component (A) since when the proportion is lower than 0.1 part by weight, a sufficient vulcanizing density cannot be obtained and when the proportion is higher than 10 parts by weight, the component (C) bleeds to the surface of the elastomer upon molding to cause failure in molding. Especially preferred proportion of the component (C) is 0.2 to 6 parts by weight.

The hydrotalcite compounds as the component (D) are preferably those which are represented by the formula $[Mg_xAl_2(OH)_{2x+6-2z}]^{2z+}(CO_3^{2-})_z \cdot mH_2O$ (wherein x is a positive number of 2 or more, z is a number selected from 0, 1 and 2, and m is a positive number) or a calcined product thereof and those which are represented by the formula $[(M_1^{2+})_{y1}(M_2^{2+})_{y2}]_{1-x1} \cdot M_{x1}^{3+}(OH)_2 A_{x1/n}^{n-} \cdot mH_2O$ (wherein $M_1^{2+}$ is at least one element selected from the group consisting of Mg, Ca, Sr and Ba, $M_2^{2+}$ is at least one element selected from the group consisting of Zn, Cd, Pb and Sn, $M^{3+}$ is a trivalent metal, $A^{n-}$ is an n-valent anion, and $0 < x1 \leq 0.5$, $0.5 < y1 < 1$, $0.5 < y2 < 1$ and $0 \leq m < 2$). Especially preferred are hydrotalcite compounds represented by the formula $[Mg_xAl_2(OH)_{2x+6-2z}]^{2z+}(CO_3^{2-})_z \cdot mH_2O$ (wherein x is a positive number of 2 or more, z is a number selected from 0, 1 and 2, and m is a positive number), or calcined products thereof.

Examples of the component (D) include 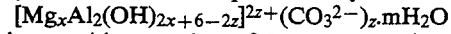 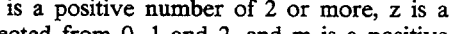 $[Mg_{4.5}Al_2(OH)_{13}]^{2+}CO_3^{2-} \cdot 3.5H_2O$ and $Mg_4Al_2O_7$ which is a calcined product of  These are marketed under the names of "DHT-4A", "DHT-4A-2", "DHT-4C", "KYOWAAD 2200", "KYOWAAD 500 PL" and "ALCAMAC L" manufactured by Kyowa Chemical Industry Co., Ltd.

Hydrotalcite compounds occur in nature in Ural district and Norway and can also be synthesized by the processes as described in U.S. Pat. No. 3,539,306 and Japanese Patent Publication Examined No. 50('75)-30039, etc. Moreover, the hydrotalcite compounds may be subjected to surface treatment with an anionic surface active agent by the process disclosed in U.S. Pat. No. 4,558,102 to improve dispersibility thereof into the elastomer at the time of mixing.

As an example of using hydrotalcite compounds in fluorine-containing elastomers, there is one example according to which a hydrotalcite compound subjected to surface treatment with an anionic surface active agent is added to a polyamine-vulcanizable fluorine-containing elastomer in an attempt to improve water resistance (U.S. Pat. No. 4,558,102).

However, no example is shown which uses hydrotalcite compounds for improving permanent compression set and adhesion after vulcanization of peroxide-vulcanizable fluorine-containing elastomers containing iodine and/or bromine which become a vulcanizing point.

The blending ratio of the component (D) is preferably 0.5 to 40 parts by weight, more preferably 1 to 20 parts by weight based on 100 parts by weight of the component (A) since when the ratio is lower than 0.5 part by weight, adhesive strength is low and when the ratio is higher than 40 parts by weight, permanent compression set deteriorates.

Furthermore, the fluorine-containing vulcanizable elastomer composition of the present invention may optionally contain other components such as fillers, divalent metal oxides or hydroxides, processing agents and colorants.

The fillers include preferably carbon black, austine black, graphite, silica, clay, diatomaceous earth, talc, wollastonite, calcium carbonate, calcium silicate, calcium fluoride, barium sulfate, and the like. The blending ratio of the filler is preferably 0.1 to 100 parts by weight, especially preferably 1 to 60 parts by weight based on 100 parts by weight of the component (A) since when the ratio is lower than 0.1 part by weight, no effect of adding the filler is exhibited and when the ratio is higher than 100 parts by weight, the elastomer loses elasticity.

The divalent metal oxides or hydroxides include preferably magnesium oxide, magnesium hydroxide, calcium oxide, calcium hydroxide, zinc oxide, lead oxide, and the like.

The processing agents include preferably sulfonic compounds, phosphate esters, fatty amines, higher fatty acid esters, fatty acid esters of calcium, fatty amides, low-molecular weight polyethylenes, silicone oils, silicone greases, stearic acid, sodium stearate, calcium stearate, magnesium stearate, aluminum stearate, zinc stearate, and the like.

The colorants include preferably titanium white, red iron oxide, and the like.

Furthermore, known vulcanizing agents or vulcanization accelerators may be added as far as they do not deviate from the purpose of the present invention.

For making molded articles from the fluorine-containing elastomer composition of the present invention, preferably the composition is mixed, for instance, by open mill rolls or closed mill rolls (such as Banbury mixer and a pressure kneader) and then the mixed composition is charged in a mold by compression molding, casting, injection molding, and the like, and pressed to carry out a primary vulcanization and then, is optionally subjected to a secondary vulcanization.

The conditions for the primary vulcanization are Preferably, temperature: 120° to 200° C., time: 1 to 180 minutes, and pressure: 20 to 150 kg/m$^2$. The conditions for the secondary vulcanization are preferably, temperature: 120° to 250° C. and time: 0 to 48 hours.

The resulting molded articles are excellent in permanent compression set while having excellent tensile characteristics, heat resistance and chemical resistance corresponding to those of the molded articles obtained from the conventionally known peroxide-vulcanizable fluorine-containing elastomer compositions. Thus, they are suitable for use as sealing materials such as O-rings and gaskets.

The laminate comprising a metal, a resin, an elastomer or a fiber and a cured product of the fluorine-containing elastomer composition of the present invention which are laminated with an adhesive which is placed therebetween and cured by vulcanization can be made, for example, by charging the above-described mixed composition in a mold by the above-mentioned methods, and pressing the composition together with a metal, a resin, an elastomer or a fiber coated with an adhesive curable by vulcanization to perform the primary vulcanization, thereby to cure the mixed composition and the adhesive simultaneously and if necessary, carrying out the secondary vulcanization. The conditions for the primary vulcanization and the secondary vulcanization are respectively the same as described above.

The laminate of the present invention is excellent in permanent compression set while having excellent tensile characteristics, heat resistance and chemical resistance compared to those of a laminated obtained from conventionally known peroxide-vulcanizable fluorine-containing elastomer compositions. Besides, in this laminate the metal, resin, elastomer or fiber and the cured fluorine-containing elastomer composition are firmly bonded with an adhesive which is placed therebetween and cured by vulcanization. It may be for this reason that failure in bonding at the time of molding can be largely diminished according to the above method for making the laminates of the present invention. Furthermore, the problem of the metal, resin, elastomer or fiber and the cured fluorine-containing elastomer composition separating during use of the laminate is considerably reduced and thus the laminate is most suitable for use such as an oil seal.

The metal which forms a laminate together with a cured product of the fluorine-containing elastomer with an adhesive includes preferably stainless steel, iron, brass, aluminum, or the like.

The resin which forms the laminate includes preferably nylon, polysulfone, polyacetal, polybutylene terephthalate, polyimide, polyether ketone, polyethylene terephthalate, polycarbonate, polyphenylene oxide, polyphenylene sulfide, fluorocarbon resin, or the like.

The elastomer which forms the laminate includes preferably fluorine-containing elastomer, nitrile elastomer, hydrogenated nitrile elastomer, acrylic elastomer, ethylenepropylene elastomer, silicone elastomer, chlorosulfonated polyethylene elastomer, hydrin elastomer, urethane elastomer, or the like.

The fiber which forms the laminate includes preferably nylon, polyvinylidene fluoride, or the like.

As the adhesive curable by vulcanization as employed in the present invention, there may be used silane coupling agent type, epoxy resin type or phenolic resin type which has durability in the environment of using the fluorine-containing elastomers. Commercially available adhesives include, for example, "CHEMLOK Y-4310", "CHEMLOK 607" and "CHEMLOK Y-5323" manufactured by Lord Far East Inc., "MONICAS CF-5M", "MONICAS QZR-48", "MONICAS V-16A/B" and "MONICAS M-16A/B" manufactured by Yokohama Kobunshi Kenkyujo Co., Ltd., "AN-187" manufactured by Thixon Inc., and "METALOC S-2", "METALOC S-7" and "METALOC S-10A" manufactured by Toyokagaku Kenkyusho Co., Ltd. If necessary, these adhesives may be diluted with organic solvents.

The molded articles available from the composition of the present invention include, for example, an O-ring, a X-ring, a U-ring, a V-packing, a gasket, a hose, a belt, a glove and an expansion joint.

The laminates comprising a metal, resin, elastomer or fiber and the cured product of the composition of the present invention which are laminated with an adhesive cured by vulcanization include, for example, an oil seal, a crankshaft seal, a diaphragm, a needle valve, a check valve and a valve stem seal.

EXAMPLES

The present invention is explained in more detail by the following examples, but is not construed as limited by the examples.

Properties of the vulcanizable fluorine-containing elastomer composition were evaluated in the following manner and the vulcanizing adhesive test was conducted in the following manner.

(1) Mooney viscosity was measured in accordance with JIS-K6300 using L type rotor under the conditions of a temperature of 121° C., a preheating time of 1 minute and a rotor operating time of 10 minutes.

(2) Hardness of vulcanized product [JIS-A], 100% tensile stress, tensile strength and elongation were measured in accordance with JIS-K6301.

(3) Permanent compression set was measured in accordance with ASTM-D1414 using P-24 of dynamic O-ring specified in JIS-B2401 under the conditions of 200° C. and 70 hours.

(4) The adhesion test was conducted in the following manner.

1. One side of a metallic test piece of 15 mm in width, 50 mm in length and 1 mm in thickness made of SUS304 was polished by a polishing cloth #240.

2. The polished surface of the metallic test piece was degreased with methyl ethyl ketone and dried by placing it in a dryer of 120° C. for 10 minutes.

3. The polished surface of the metallic test piece was coated once with an adhesive "CHEMLOK Y-4310" (manufactured by Lord Far East Inc.) by a brush and dried at room temperature for 30 minutes.

4. The surface coated with the adhesive was overcoated with "CHEMLOK Y-4310" by a brush and again dried at room temperature for 30 minutes.

5. The test piece was placed in a dryer of 120° C. to bake the coat for 15 minutes.

6. Four test pieces thus treated were laid in a preheated mold and the fluorine-containing elastomer composition was put thereon and press-vulcanization was carried out.

7. The adhesion test pieces were taken out from the mold and secondary vulcanization was carried out in an air-circulating oven.

8. A cut is made into the elastomer portion with a cutter knife and the elastomer is peeled off from the metallic test piece by grasping a portion of the elastomer with pinchers.

9. The area where the adhered test piece is cut at the elastomer portion and the elastomer has remained on the metallic test piece is designated as the retention ratio of elastomer. When the elastomer completely adheres to the metallic piece, the elastomer retention ratio is considered to be 100%.

(5) The lubricating oil resistance test was conducted in accordance with JIS K6301 at 150° C. for 1000 hours using GEARLUBE EP80 manufactured by Nippon Oil Co., Ltd. as a test oil.

EXAMPLE 1

100 Parts by weight of a fluorine-containing elastomer comprising 47.6% by weight of VdF unit, 31% by weight of HFP unit and 21% by weight of TFE unit, containing at a terminal of the polymer chain 0.4% by weight of iodine capable of becoming a vulcanizing point and having a Mooney viscosity $ML_{1+10}$(121° C.) of 40 was wound around open mill rolls and 20 parts by weight of MT carbon black "THERMAX N-990" manufactured by Cancarb Co. and 3 parts by weight of a hydrotalcite compound $[Mg_4Al_2(OH)_{12}]^{2-} + CO_3^{2-}$ "DHT-4A-2" manufactured by Kyowa Chemical Industry Co., Ltd. were incorporated into said fluorine-containing elastomer. Then, 4 parts by weight of triallyl isocyanurate "TAIC" manufactured by Nippon Kasei Co., Ltd. and 3.75 parts by weight of 2,5-dimethyl-2,5-di(tert-butylperoxy)hexane "PERHEXA 25B-40 (peroxide content 40% by weight) manufactured by Nippon Oil & Fats Co., Ltd. were incorporated thereinto and the mixed product was aged by leaving overnight as it was.

Thereafter, the mixed product was re-mixed and charged in a mold and subjected to press vulcanization at 160° C. for 10 minutes and molded into a sheet, an O-ring and a sample for adhesion test. Then, the molded article was taken out of the mold and heated at 180° C. for 4 hours in an air-circulation oven to complete the secondary vulcanization and subjected to the various tests.

The test results on the physical properties, permanent compression set and adhesion after vulcanization of the vulcanized product are shown in Table 1.

EXAMPLE 2

Example 1 was repeated except that the hydrotalcite compound was used in an amount of 6 parts by weight in place of 3 parts by weight. The test results are shown in Table 1.

EXAMPLE 3

Example 1 was repeated except that the hydrotalcite compound was used in an amount of 10 parts by weight in place of 3 parts by weight. The test results are shown in Table 1.

Comparative Example 1

Example 1 was repeated except that the hydrotalcite compound was not used. The test results are shown in Table 1.

Comparative Example 2

Example 1 was repeated except that 3 parts by weight of a high-activity magnesium oxide "KYOWAMAG 150" manufactured by Kyowa Chemical Industry Co., Ltd. was used in place of the hydrotalcite compound. The test results are shown in Table 2.

Comparative Example 3

Example 1 was repeated except that 3 parts by weight of a low-activity magnesium oxide "KYOWAMAG 30" manufactured by Kyowa Chemical Industry Co., Ltd. was used in place of the hydrotalcite compound. The test results are shown in Table 2.

Comparative Example 4

Example 1 was repeated except that 3 parts by weight of calcium hydroxide "CALVIT" manufactured by Omi Chemical Industry Co., Ltd. was used in place of the hydrotalcite compound. The test results are shown in Table 2.

Comparative Example 5

Example 1 was repeated except that 3 parts by weight of lead oxide "LITHARGE No. 1 Kiguchi" manufactured by Nihon Chemical Industry Co., Ltd. was used in place of the hydrotalcite compound. The test results are shown in Table 2.

The vulcanization molded samples obtained in Examples 1 to 3 using the peroxide-vulcanizable fluorine-containing elastomers containing iodine capable of becoming a vulcanizing point at the terminal of the polymer chain to which the hydrotalcite compound was added were improved in permanent compression set as compared with those obtained in Comparative Example 1 in which the hydrotalcite compound was not used and those obtained in Comparative Examples 2 to 5 in which the conventionally known high-activity magnesium oxide, low-activity magnesium oxide, calcium hydroxide or lead oxide was used. Furthermore, the compositions of the present invention were markedly improved in adhesion after vulcaniziation to metals as compared with the conventionally known compositions.

EXAMPLE 4

Example 1 was repeated except that "DAI-EL G-912" manufactured by Daikin Kogyo Co., Ltd. comprising VdF unit/HFP unit/TFE unit, containing iodine capable of becoming a vulcanizing point at the terminal of the polymer chain, having a Mooney viscosity $ML_{1+10}$ (121° C.) of 50 and containing 70% by weight of fluorine was used in place of the fluorine-containing elastomer used in Example 1. The test results are shown in Table 3.

Comparative Example 6

Example 4 was repeated except that the hydrotalcite compound was not used. The test results are shown in Table 3.

Comparative Example 7

Example 4 was repeated except that 3 parts by weight of a low-activity magnesium oxide "KYOWAMAG 30" was used in place of the hydrotalcite compound. The test results are shown in Table 3.

The product prepared in Example 4 using the peroxide-vulcanizable fluorine-containing elastomer containing iodine capable of becoming a vulcanizing point at the terminal of the polymer chain other than the elastomer of Example 1 to which a hydrotalcite compound was added was also improved in permanent compression set as compared with the product prepared in Comparative Example 6 using no hydrotalcite compound and the product prepared in Comparative Example 7 using the low-activity magnesium oxide.

EXAMPLE 5

100 parts by weight of a fluorine-containing elastomer "VITON GF" manufactured by E. I. Du Pont de Nemours, and Co. comprising VdF unit/HFP unit/TFE unit/BCSM unit, containing bromine capable of becoming a vulcanizing point, having a Mooney viscosity $ML_{1+10}$(121° C.) of 65 and containing 70% by weight of fluorine was wound around open mill rolls and 20 parts by weight of MT carbon black "THERMAX N-990" and 3 parts by weight of a hydrotalcite compound "DHT-4A-2" were incorporated into said fluorine-containing elastomer. Then, 3 parts by weight of triallyl isocyanurate "TAIC" and 3 parts by weight of an organic peroxide "PERHEXA 25B-40" were incorporated thereinto and the mixed product was aged by leaving overnight as it was.

Thereafter, the mixed product was re-mixed and charged in a mold and subjected to press vulcanization at 170° C. for 10 minutes and molded into a sheet and an O-ring. Then, the molded article was removed from the mold and heated at 232° C. for 24 hours in an air-circulation oven to complete the secondary vulcanization and subjected to the various tests.

The test results on the physical properties and permanent compression set of the vulcanized product are shown in Table 4.

Comparative Example 8

Example 5 was repeated except that 3 parts by weight of a low-activity magnesium oxide "KYOWAMAG 30" was used in place of 3 parts by weight of the hydrotalcite compound "DHT-4A-2". The results are shown in Table 4.

The product prepared in Example 5 using the peroxide-vulcanizable fluorine-containing elastomer containing bromine capable of becoming a vulcanizing point to which the hydrotalcite compound was added was greatly improved in permanent compression set as compared with the product prepared in Comparative Example 8 using the low-activity magnesium oxide.

EXAMPLE 6

Example 5 was repeated except that a fluorine-containing elastomer "VITON GFLT" manufactured by E. I. Du Pont de Nemours, and Co. comprising VdF unit/PFMVE unit/TFE unit/BCSM unit, containing bromine capable of becoming a vulcanizing point, having a Mooney viscosity $ML_{1+10}$ (121° C.) of 70 and containing 67% by weight of fluorine was used in place of "VITON GF" and 30 parts by weight of MT carbon black "THERMAX N-990", 4 parts by weight of triallyl isocyanurate "TAIC" and 3.75 parts by weight of the organic peroxide "PERHEXA 25B-40" were used. The test results are shown in Table 4.

Comparative Example 9

Example 6 was repeated except that 3 parts by weight of lead oxide "LITHARGE No. 1 Kiguchi" was used in place of 3 parts by weight of the hydrotalcite compound "DHT-4A-2". The test results are shown in Table 4.

The product prepared in Example 6 using the fluorine-containing elastomer comprising VdF unit/PFMVE unit/TFE unit/BCSM unit and containing bromine capable of becoming a vulcanizing point to which the hydrotalcite compound was added was improved in permanent compression set as compared with the product prepared in Comparative Example 9 using lead oxide.

EXAMPLE 7

50 parts by weight of a fluorine-containing elastomer comprising 36% by weight of VdF unit, 38.6% by weight of HFP unit and 25% by weight of TFE unit, containing 0.4% by weight of iodine capable of becoming a vulcanizing point at the terminal of the polymer chain and having a Mooney viscosity $ML_{1+10}$ (121° C.) of 30 and 50 parts by weight of fluorine-containing elastomer "VITON GF" containing bromine capable of becoming a vulcanizing point used in Example 5 were wound around open mill rolls and were blended and then, 20 parts by weight of MT carbon black "THERMAX N-990" and 3 parts by weight of the hydrotalcite compound "DHT-4A-2" were incorporated into said blended fluorine-containing elastomers. Then, 4 parts by weight of triallyl isocyanurate "TAIC" and 3.75 parts by weight of the organic peroxide "PERHEXA 25B-40" were incorporated thereinto and the mixed product was aged by leaving overnight as it was.

Thereafter, the mixed product was re-mixed and charged in a mold and subjected to press vulcanization at 160° C. for 15 minutes and molded into a sheet and an O-ring. Then, the molded article was taken out of the mold and heated at 180° C. for 4 hours in an air-circulation oven to complete the secondary vulcanization and subjected to the various tests.

The test results on the physical properties and permanent compression set of the vulcanized product are shown in Table 5.

Comparative Example 10

Example 7 was repeated except that 3 parts by weight of a low-activity magnesium oxide "KYOWAMAG 30" was used in place of 3 parts by weight of the hydrotalcite compound "DHT-4A-2". The test results are shown in Table 5.

The product prepared in Example 7 using the blend of the fluorine-containing elastomer containing iodine capable of becoming a vulcanizing point at the terminal of the polymer chain and the fluorine-containing elastomer containing bromine capable of becoming a vulcanizing point to which the hydrotalcite compound was added was improved in permanent compression set as compared with the product prepared in Comparative Example 10 using the low-activity magnesium oxide.

EXAMPLE 8

Example 1 was repeated except that the organic peroxide "PERHEXA 25B-40" was used in an amount of 1.75 part by weight in place of 3.75 parts by weight. The test results are shown in Table 6.

EXAMPLE 9

Example 8 was repeated except that a hydrotalcite compound $[Mg_6Al_2(OH)_{16}]^{2+}CO_3^{2-}.4H_2O$ "ALCAMAC L" manufactured by Kyowa Chemical Industry Co., Ltd. was used as the hydrotalcite compound used in Example 8. The test results are shown in Table 6.

EXAMPLE 10

Example 8 was repeated except that $Mg_4Al_2O_7$ "KYOWAAD 2200" manufactured by Kyowa Chemical Industry Co., Ltd. which was a calcined product of the hydrotalcite compound "DHT-4A-2" was used as the hydrotalcite compound used in Example 8. The test results are shown in Table 6.

EXAMPLE 11

Example 8 was repeated except that the other hydrotalcite compound "DHT-4C" manufactured by Kyowa Chemical Industry Co., Ltd. was used as the hydrotalcite compound used in Example 8. The test results are shown in Table 6.

The permanent compression set was also improved when a calcined product of the hydrotalcite compound used in Example 1 or the other hydrotalcite compound than the hydrotalcite compound used in Example 1 was used.

Comparative Example 11

100 parts by weight of a fluorine-containing elastomer "AFLAS 150E" manufactured by Asahi Glass Co., Ltd. comprising 55 mol % by weight of TFE unit and 45 mol % of propylene unit and having a Mooney viscosity $ML_{1+4}$ (100° C.) of 65 in which the site of the propylene unit dehydrogenated with an organic peroxide became a vulcanizing point was wound around open mill rolls and then, 20 parts by weight of MT carbon black "THERMAX N-990" and 3 parts by weight of the hydrotalcite compound "DHT-4A-2" and 1 part by weight of sodium stearate were incorporated into said fluorine-containing elastomer. Then, 3 parts by weight of triallyl isocyanurate "TAIC" and 3 parts by weight of an organic peroxide "PERHEXA 25B-40 were incorporated thereinto and the mixed product was aged by leaving overnight as it was.

Thereafter, the mixed product was re-mixed and charged in a mold and subjected to press vulcanization at 170° C. for 10 minutes and molded into a sheet and an O-ring. Then, the molded article was taken out of the mold and heated at 200° C. for 24 hours in an air-circulation oven to complete the secondary vulcanization and subjected to the various tests.

The test results on the physical properties and permanent compression set of the vulcanized product are shown in Table 7.

Comparative Example 12

Comparative Example 11 was repeated except that 3 parts by weight of the low-activity magnesium oxide "KYOWAMAG 30" was used in place of the hydrotalcite compound used in Comparative Example 11. The test results are shown in Table 7.

Even when a peroxide-vulcanizable fluorine-containing elastomer was used with addition of a hydrotalcite compound, the permanent compression set cannot be improved if the fluorine-containing elastomer does not contain iodine and/or bromine capable of becoming a vulcanizing point.

Comparative Example 13

100 parts by weight of a fluorine-containing elastomer for vulcanization with polyols comprising 48% by weight of VdF unit, 31% by weight of HFP unit and 21% by weight of TFE unit, and having a Mooney viscosity $ML_{1+10}$ (121° C.) of 60 and containing neither iodine nor bromine was wound around open mill rolls and then, 2 parts by weight of BISPHENOL AF and 0.38 part by weight of bis(benzyldiphenylphosphine)iminium chloride were incorporated thereinto. Then, 20 parts by weight of MT carbon black "THERMAX N-990", 3 parts by weight of the hydrotalcite compound "DHT-4A-2" and 6 parts by weight of calcium hydroxide "CALVIT" were incorporated thereinto and aging was carried out by leaving the mixed product overnight as it was.

Thereafter, the mixed product was re-mixed and charged in a mold and subjected to press vulcanization at 170° C. for 20 minutes and molded into a sheet and an O-ring. Then, the molded article was taken out of the mold and heated at 232° C. for 24 hours in an air-circulation oven to complete the secondary vulcanization and subjected to the various tests.

The test results on the physical properties and permanent compression set of the vulcanized product are shown in Table 7.

Comparative Example 14

Comparative Example 13 was repeated except that 3 parts by weight of the high-activity magnesium oxide "KYOWAMAG 150" was used in place of the hydrotalcite compound as used in Comparative Example 13. The test results are shown in Table 7.

In the case of vulcanization with polyols, even if the hydrotalcite compound was added, the permanent compression set was similar to that obtained by adding the ordinarily used high-activity magnesium oxide, and the permanent compression set resistance cannot be enhanced by using the hydrotalcite compound.

EXAMPLE 12

The vulcanization molded article obtained in Example 1 was subjected to the lubricating oil immersing test. The results are shown in Table 8.

Comparative Example 15

The vulcanization molded article obtained in Comparative Example 13 was subjected to the same test as in Example 12. The results are shown in Table 8.

The molded article vulcanized with an aromatic polyol and tested in Comparative Example 15 was considerably inferior in lubricating oil resistance to the article vulcanized with a peroxide and tested in Example 12.

TABLE 1

|  | Example 1 | Example 2 | Example 3 | Comparative Example 1 |
|---|---|---|---|---|
| Composition |  |  |  |  |
| Elastomer of Example 1 | 100 | 100 | 100 | 100 |
| MT carbon black[1] | 20 | 20 | 20 | 20 |
| Hydrotalcite compound of Example 1[2] | 3 | 6 | 10 |  |
| Triallyl isocyanurate[3] | 4 | 4 | 4 | 4 |
| Organic peroxide[4] | 3.75 | 3.75 | 3.75 | 3.75 |
| Vulcanizing conditions |  |  |  |  |
| Press vulcanization at 160° C. (min) | 10 | 10 | 10 | 10 |
| Secondary vulcanization at 180° C. (hr) | 4 | 4 | 4 | 4 |
| Properties of vulcanized product |  |  |  |  |
| 100% Tensile stress (kgf/cm$^2$) | 41 | 44 | 52 | 36 |
| Tensile strength (kgf/cm$^2$) | 245 | 238 | 232 | 233 |
| Elongation (%) | 355 | 345 | 335 | 350 |
| Hardness [JIS-A] (pts) | 73 | 72 | 73 | 70 |
| Permanent compression set |  |  |  |  |
| 200° C. × 70 hours (%) | 29 | 29 | 32 | 36 |
| Vulcanization adhesion test |  |  |  |  |
| Retention ratio of elastomer (%) | 85 | 95 | 100 | 10 |

[1]"THERMAX N-990" of Cancarb Co.
[2][Mg$_4$Al$_2$(OH)$_{12}$]$^{2+}$CO$_3$$^{2-}$ "DHT-4A-2" of Kyowa Chemical Industry Co.
[3]"TAIC" of Nihon Kasei Co.
[4]"PERHEXA 25B-40" of Nippon Oil & Fats Co., Ltd.

TABLE 2

|  | Comparative Example 2 | Comparative Example 3 | Comparative Example 4 | Comparative Example 5 |
|---|---|---|---|---|
| Composition |  |  |  |  |
| Elastomer of Example 1 | 100 | 100 | 100 | 100 |
| MT carbon black[1] | 20 | 20 | 20 | 20 |
| High-activity magnesium oxide[2] | 3 |  |  |  |
| Low-activity magnesium oxide[3] |  | 3 |  |  |
| Calcium hydroxide[4] |  |  | 3 |  |
| Lead oxide[5] |  |  |  | 3 |
| Triallyl isocyanurate[6] | 4 | 4 | 4 | 4 |
| Organic peroxide[7] | 3.75 | 3.75 | 3.75 | 3.75 |
| Vulcanizing conditions |  |  |  |  |
| Press vulcanization at 160° C. (min) | 10 | 10 | 10 | 10 |
| Secondary vulcanization at 180° C. (hr) | 4 | 4 | 4 | 4 |
| Properties of vulcanized product |  |  |  |  |
| 100% Tensile stress (kgf/cm$^2$) | 36 | 37 | 39 | 36 |
| Tensile strength (kgf/cm$^2$) | 247 | 235 | 241 | 239 |
| Elongation (%) | 385 | 335 | 360 | 375 |
| Hardness [JIS-A] (pts) | 71 | 72 | 72 | 71 |
| Permanent compression set |  |  |  |  |
| 200° C. × 70 hours (%) | 38 | 37 | 38 | 37 |
| Vulcanization adhesion test |  |  |  |  |
| Retention ratio of elastomer (%) | 30 | 20 | 20 | 10 |

[1]"THERMAX N-990" of Cancarb Co.
[2]"KYOWAMAG 150" of Kyowa Chemical Industry Co.
[3]"KYOWAMAG 30" of Kyowa Chemical Industry Co.
[4]"CALVIT" of Omi Chemical Industry Co.
[5]"LITHERGE (No. 1 Kiguchi)" of Nihon Chemical Industry Co.
[6]"TAIC" of Nihon Kasei Co.
[7]"PERHEXA 25B-40" of Nippon Oil & Fats Co., Ltd.

TABLE 3

|  | Example 4 | Comparative Example 6 | Comparative Example 7 |
|---|---|---|---|
| Composition |  |  |  |
| Elastomer of Example 4 | 100 | 100 | 100 |
| MT carbon black[1] | 20 | 20 | 20 |
| Hydrotalcite compound of Example 1[2] | 3 |  |  |
| Low-activity magnesium oxide[3] |  |  | 3 |
| Triallyl isocyanurate[4] | 4 | 4 | 4 |
| Organic peroxide[5] | 3.75 | 3.75 | 3.75 |
| Vulcanizing conditions |  |  |  |
| Press vulcanization at 160° C. (min) | 10 | 10 | 10 |
| Secondary vulcanization at 180° C. (hr) | 4 | 4 | 4 |
| Properties of vulcanized product |  |  |  |
| 100% Tensile stress (kgf/cm$^2$) | 141 | 128 | 146 |
| Tensile strength (kgf/cm$^2$) | 257 | 253 | 257 |
| Elongation (%) | 160 | 175 | 155 |
| Hardness [JIS-A] (pts) | 77 | 76 | 76 |
| Permanent compression set |  |  |  |
| 200° C. × 70 hours (%) | 18 | 25 | 23 |

[1] "THERMAX N-990" of Cancarb Co.
[2] $[Mg_4Al_2(OH)_{12}]^{2+}CO_3^{2-}$ "DHT-4A-2" of Kyowa Chemical Industry Co.
[3] "KYOWAMAG 30" of Kyowa Chemical Industry CO., Ltd.
[4] "TAIC" of Nihon Kasei Co.
[5] "PERHEXA 25B-40" of Nippon Oil & Fats Co., Ltd.

TABLE 5

|  | Example 7 | Comparative Example 10 |
|---|---|---|
| Composition |  |  |
| Elastomer of Example 7 | 100 | 100 |
| MT carbon black[1] | 20 | 20 |
| Hydrotalcite compound of Example 1[2] | 3 |  |
| Low-activity magnesium oxide[3] |  | 3 |
| Triallyl isocyanurate[4] | 4 | 4 |
| Organic peroxide[5] | 3.75 | 3.75 |
| Vulcanizing conditions |  |  |
| Press vulcanization at 160° C. (min) | 15 | 15 |
| Secondary vulcanization at 180° C. (hr) | 4 | 4 |
| Properties of vulcanized product |  |  |
| 100% Tensile stress (kgf/cm$^2$) | 70 | 77 |
| Tensile strength (kgf/cm$^2$) | 247 | 230 |
| Elongation (%) | 280 | 290 |
| Hardness [JIS-A] (pts) | 76 | 76 |
| Permanent compression set |  |  |
| 200° × 70 hours (%) | 40 | 52 |

[1] "THERMAX N-990" of Cancarb Co.
[2] $[Mg_4Al_2(OH)_{12}]^{2+}CO_3^{2-}$ "DHT-4A-2" of Kyowa Chemical Industry Co.
[3] "KYOWAMAG 30" of Kyowa Chemical Industry Co.
[4] "TAIC" of Nihon Kasei Co.
[5] "PERHEXA 25B-40" of Nippon Oil & Fats Co., Ltd.

TABLE 4

|  | Example 5 | Comparative Example 8 | Example 6 | Comparative Example 9 |
|---|---|---|---|---|
| Composition |  |  |  |  |
| Elastomer of Example 5 | 100 | 100 |  |  |
| Elastomer of Example 6 |  |  | 100 | 100 |
| MT carbon black[1] | 20 | 20 | 30 | 30 |
| Hydrotalcite compound of Example 1[2] | 3 |  | 3 |  |
| Low-activity magnesium oxide[3] |  | 3 |  |  |
| Lead oxide[4] |  |  |  | 3 |
| Triallyl isocyanurate[5] | 3 | 3 | 4 | 4 |
| Organic peroxide[6] | 3 | 3 | 3.75 | 3.75 |
| Vulcanizing conditions |  |  |  |  |
| Press vulcanization at 170° C. (min) | 10 | 10 | 10 | 10 |
| Secondary vulcanization at 232° C. (hr) | 24 | 24 | 24 | 24 |
| Properties of vulcanized product |  |  |  |  |
| 100% Tensile stress (kgf/cm$^2$) | 55 | 62 | 67 | 76 |
| Tensile strength (kgf/cm$^2$) | 222 | 206 | 220 | 206 |
| Elongation (%) | 280 | 295 | 190 | 195 |
| Hardness [JIS-A] (pts) | 70 | 70 | 76 | 76 |
| Permanent compression set |  |  |  |  |
| 200° C. × 70 hours (%) | 48 | 67 | 25 | 32 |

[1] "THERMAX N-990" of Cancarb Co.
[2] $[Mg_4Al_2(OH)_{12}]^{2+}CO_3^{2-}$ "DHT-4A-2" of Kyowa Chemical Industry Co.
[3] "KYOWAMAG 30" of Kyowa Chemical Industry Co.
[4] "LITHERGE (No. 1 Kiguchi)" of Nihon Chemical Industry Co.
[5] "TAIC" of Nihon Kasei Co.
[6] "PERHEXA 25B-40" of Nippon Oil & Fats Co., Ltd.

TABLE 6

|  | Example 8 | Example 9 | Example 10 | Example 11 |
|---|---|---|---|---|
| Composition |  |  |  |  |
| Elastomer of Example 1 | 100 | 100 | 100 | 100 |
| MT carbon black[1] | 20 | 20 | 20 | 20 |
| Hydrotalcite compound of Example 1[2] | 3 |  |  |  |
| Hydrotalcite compound of Example 9[3] |  | 3 |  |  |
| Hydrotalcite compound of Example 10[4] |  |  | 3 |  |
| Hydrotalcite compound of Example 11[5] |  |  |  | 3 |
| Triallyl isocyanurate[6] | 4 | 4 | 4 | 4 |
| Organic peroxide[7] | 1.75 | 1.75 | 1.75 | 1.75 |
| Vulcanizing conditions |  |  |  |  |
| Press vulcanization at 160° C. (min) | 10 | 10 | 10 | 10 |
| Secondary vulcanization at 180° C. (hr) | 4 | 4 | 4 | 4 |
| Properties of vulcanized product |  |  |  |  |
| 100% Tensile stress (kgf/cm$^2$) | 36 | 43 | 37 | 37 |
| Tensile strength (kgf/cm$^2$) | 220 | 219 | 224 | 231 |

TABLE 6-continued

|  | Example 8 | Example 9 | Example 10 | Example 11 |
|---|---|---|---|---|
| Elongation (%) | 350 | 340 | 365 | 370 |
| Hardness [JIS-A] (pts) | 70 | 71 | 69 | 70 |
| Permanent compression set | | | | |
| 200° C. × 70 hours (%) | 32 | 28 | 32 | 31 |

[1] "THERMAX N-990" of Cancarb Co.
[2] $[Mg_4Al_2(OH)_{12}]^{2+}CO_3^{2-}$ "DHT-4A-2" of Kyowa Chemical Industry Co.
[3] $[Mg_6Al_2(OH)_{16}]^{2+}CO_3^{2-}.4H_2O$ "ALCAMAC L" of Kyowa Chemical Industry Co.
[4] $Mg_4Al_2O_7$ "KYOWAAD 2200" of Kyowa Chemical Industry Co.
[5] Hydrotalcite compound "DHT-4C" of Kyowa Chemical Industry Co.
[6] "TAIC" of Nihon Kasei Co.
[7] "PERHEXA 25B-40" of Nippon Oil & Fats Co., Ltd.

TABLE 7

|  | Comparative Example 11 | Comparative Example 12 | Comparative Example 13 | Comparative Example 14 |
|---|---|---|---|---|
| Composition | | | | |
| Elastomer of Comparative Example 11 | 100 | 100 | | |
| Elastomer of Comparative Example 13 | | | 100 | 100 |
| MT carbon black[1] | 20 | 20 | 20 | 20 |
| Hydrotalcite compound of Example 1[2] | 3 | | 3 | |
| Low-activity magnesium oxide[3] | | 3 | | |
| High-activity magnesium oxide[4] | | | | 3 |
| Calcium hydroxide[5] | | | 6 | 6 |
| Sodium stearate | 1 | 1 | | |
| Triallyl isocyanurate[6] | 3 | 3 | | |
| Organic peroxide[7] | 3 | 3 | | |
| Bisphenol AF | | | 2 | 2 |
| Bis(benzyldiphenylphosphine)iminium chloride | | | 0.38 | 0.38 |
| Vulcanizing conditions | | | | |
| Press vulcanization at 170° C. (min) | 10 | 10 | 20 | 20 |
| Secondary vulcanization at 200° C. (hr) | 24 | 24 | | |
| Secondary vulcanization at 232° C. (hr) | | | 24 | 24 |
| Properties of vulcanized product | | | | |
| 100% Tensile stress (kgf/cm$^2$) | 43 | 47 | 35 | 38 |
| Tensile strength (kgf/cm$^2$) | 137 | 147 | 113 | 124 |
| Elongation (%) | 310 | 345 | 290 | 290 |
| Hardness [JIS-A] (pts) | 68 | 68 | 73 | 70 |
| Permanent compression set | | | | |
| 200° C. × 70 hours (%) | 72 | 69 | 21 | 20 |

[1] "THERMAX N-990" of Cancarb Co.
[2] $[Mg_4Al_2(OH)_{12}]^{2+}CO_3^{2-}$ "DHT-4A-2" of Kyowa Chemical Industry Co.
[3] "KYOWAMAG 30" of Kyowa Chemical Industry Co.
[4] "KYOWAMAG 150" of Kyowa Chemical Industry Co.
[5] "CALVIT" of Omi Chemical Industry Co., Ltd.
[6] "TAIC" of Nihon Kasei Co.
[7] "PERHEXA 25B-40" of Nippon Oil & Fats CO., Ltd.

TABLE 8

|  | Example 12 | Comparative Example 15 |
|---|---|---|
| Sample | Vulcanization molded article of Example 1 | Vulcanization molded article of Comparative Example 13 |
| Lubricating oil resistance test 150° C. × 1000 hours | | |
| Volume change | +0.6 | +0.8 |
| Change in tensile strength (%) | −17 | −52 |
| Change in elongation (%) | −26 | −66 |
| Change in hardness [JIS-A] (pts) | ±0 | +4 |
| Surface state at elongation | No change | Cracks occurred. |

INDUSTRIAL APPLICABILITY

The peroxide-vulcanizable fluorine-containing elastomer composition of the present invention is markedly improved in permanent compression set and adhesion after vulcanization while maintaining excellent tensile characteristics, heat resistance and chemical resistance compared to those of conventionally known peroxide-vulcanizable fluorine-containing elastomer compositions. Accordingly, the composition of the present invention is applicable to new fields to which the conventionally known peroxide-vulcanizable fluorine-containing elastomer compositions are difficult to apply, such as an O-ring, a X-ring, a U-ring, a V-packing, a gasket, a hose, a belt, a glove, an expansion joint, an oil seal, a crankshaft seal, a diaphragm, a needle valve, a check valve, a valve stem seal, and others. Thus, the composition of the present invention has a very high industrial value.

We claim:

1. A fluorine-containing elastomer composition consisting essentially of:
   (A) a fluorine-containing elastomer which is vulcanizable with a peroxide and which contains iodine and/or bromine to be a vulcanizing point, (B) an organic peroxide,
(C) a co-vulcanizing agent,
(D) a hydrotalcite compound or a calcined product thereof.

2. The fluorine-containing elastomer composition according to claim 1, wherein the fluorine-containing elastomer of component (A) comprises (a) vinylidene fluoride units and at least one sort of other fluorine-containing monomer units, and a Mooney viscosity $ML_{1+10}(121°\ C.)$ of the elastomer is in the range of 1 to 200.

3. The fluorine-containing elastomer composition according to claim 2, wherein at least one sort of the other fluorine-containing monomer units in component (A) is (b) hexafluoropropylene units and 35 to 0% by weight, based on the total weight of monomer units of (a), (b) and (c), of (c) tetrafluoroethylene units, the weight ratio of (a) vinylidene fluoride units to (b) hexafluoropropylene units being in the range of 40:60 to 80:20.

4. The fluorine-containing elastomer composition according to claim 2, wherein at least one sort of the other fluorine-containing monomer units in component (A) consists of perfluoroalkyl perfluorovinyl ether units and (c) tetrafluoroethylene units.

5. The fluorine-containing elastomer composition according to claim 4, wherein perfluoroalkyl perfluorovinyl ether units in component (A) are perfluoroalkyl perfluorovinyl ether units containing a perfluoroalkyl group having a carbon number of 1 to 4.

6. The fluorine-containing elastomer composition according to claim 4, wherein perfluoroalkyl perfluorovinyl ether units in component (A) are perfluoromethyl perfluorovinyl ether units.

7. The fluorine-containing elastomer composition according to claim 1, wherein the fluorine-containing elastomer of component (A) contains iodine and/or bromine to be a vulcanizing point in the range of 0.001 to 10 wt. % in the elastomer.

8. The fluorine-containing elastomer composition according to claim 2, wherein the fluorine-containing elastomer of component (A) contains iodine and/or bromine to be a vulcanizing point in the range of 0.001 to 10 wt. % in the elastomer.

9. The fluorine-containing elastomer composition according to claim 3, wherein the fluorine-containing elastomer of component (A) contains iodine and/or bromine to be a vulcanizing point in the range of 0.001 to 10 wt. % in the elastomer.

10. The fluorine-containing elastomer composition according to claim 4, wherein the fluorine-containing elastomer of component (A) contains iodine and/or bromine to be a vulcanizing point in the range of 0.001 to 10 wt. % in the elastomer.

11. The fluorine-containing elastomer composition according to claim 5, wherein the fluorine-containing elastomer of component (A) contains iodine and/or bromine to be a vulcanizing point in the range of 0.001 to 10 wt. % in the elastomer.

12. The fluorine-containing elastomer composition according to claim 6, wherein the fluorine-containing elastomer of component (A) contains iodine and/or bromine to be a vulcanizing point in the range of 0.001 to 10 wt. % in the elastomer.

13. The fluorine-containing elastomer composition according to claim 1, wherein the fluorine-containing elastomer of component (A) contains iodine to be a vulcanizing point in the range of 0.001 to 10 wt. % in the elastomer.

14. The fluorine-containing elastomer composition according to claim 2, wherein the fluorine-containing elastomer of component (A) contains iodine to be a vulcanizing point in the range of 0.001 to 10 wt. % in the elastomer.

15. The fluorine-containing elastomer composition according to claim 3, wherein the fluorine-containing elastomer of component (A) contains iodine to be a vulcanizing point in the range of 0.001 to 10 wt. % in the elastomer.

16. The fluorine-containing elastomer composition according to claim 4, wherein the fluorine-containing elastomer of component (A) contains iodine to be a vulcanizing point in the range of 0.001 to 10 wt. % in the elastomer.

17. The fluorine-containing elastomer composition according to claim 1, wherein the fluorine-containing elastomer of component (A) contains bromine to be a vulcanizing point in the range of 0.001 to 10 wt. % in the elastomer.

18. The fluorine-containing elastomer composition according to claim 2, wherein the fluorine-containing elastomer of component (A) contains bromine to be a vulcanizing point in the range of 0.001 to 10 wt. % in the elastomer.

19. The fluorine-containing elastomer composition according to claim 3, wherein the fluorine-containing elastomer of component (A) contains bromine to be a vulcanizing point in the range of 0.001 to 10 wt. % in the elastomer.

20. The fluorine-containing elastomer composition according to claim 4, wherein the fluorine-containing elastomer of component (A) contains bromeine to be a vulcanizing point in the range of 0.001 to 10 wt. % in the elastomer.

21. The fluorine-containing elastomer composition according to claim 6, wherein the fluorine-containing elastomer of component (A) contains bromine to be a vulcanizing point in the range of 0.001 to 10 wt. % in the elastomer.

22. The fluorine-containing elastomer composition according to claim 1, wherein the fluorine-containing elastomer of component (A) contains iodine and bromine to be a vulcanizing point in the range of 0.001 to 10 wt. % in the elastomer.

23. The fluorine-containing elastomer composition according to claim 2, wherein the fluorine-containing elastomer of component (A) contains iodine and bromine to be a vulcanizing point in the range of 0.001 to 10 wt. % in the elastomer.

24. The fluorine-containing elastomer composition according to claim 3, wherein the fluorine-containing elastomer of component (A) contains iodine and bromine to be a vulcanizing point in the range of 0.001 to 10 wt. % in the elastomer.

25. The fluorine-containing elastomer composition according to claim 4, wherein the fluorine-containing elastomer of component (A) contains iodine and bromine to be a vulcanizing point in the range of 0.001 to 10 wt. % in the elastomer.

26. The fluorine-containing elastomer composition according to claim 2, wherein the organic peroxide of component (B) is at least one selected from the group consisting of 2,5-dimethyl-2,5-di(tert-butylperoxy)hexane, dicumyl peroxide, and $\alpha,\alpha'$-bis(tert-butylperoxy-m-isopropyl)benzene.

27. The fluorine-containing elastomer composition according to claim 2, wherein the co-vulcanizing agent of component (C) is triallyl isocyanurate.

28. The fluorine-containing elastomer composition according to claim 2, wherein the hydrotalcite compound of component (D) is the hydrotalcite compound represented by the structural formula:

$$[Mg_xAl_2(OH)_{2x+6-2z}]^{2Z+} (CO_3{}^{2-})_z \cdot mH_2O$$

wherein x is a positive number not lower than 2, z is a number selected from 0, 1 and 2, and m is a positive number, or a calcined product thereof.

29. The fluorine-containing elastomer composition according to claim 2, wherein the hydrotalcite compound of component (D) is the hydrotalcite compound represented by the structural formula:

$$[Mg_xAl_2(OH)_{2x+6-2z}]^{2Z+} (CO_3{}^{2-})_z \cdot mH_2O$$

wherein x is a positive number not lower than 2, z is a number selected from 0, 1 and 2, and m is a positive number.

30. The fluorine-containing elastomer composition according to claim 2, wherein the composition consists of,
(A) a fluorine-containing elastomer which is vulcanizable with a peroxide and which contains iodine and/or bromine to be a vulcanizing point,
(B) an organic peroxide,
(C) a co-vulcanizing agent,
(D) a hydrotalcite compound or a calcined product thereof, and
(E) a filler.

31. The fluorine-containing elastomer composition according to claim 1, wherein the composition consists of,
(A) a fluorine-containing elastomer which is vulcanizable with a peroxide and which contains iodine and/or bromine to be a vulcanizing point,
(B) an organic peroxide,
(C) a co-vulcanizing agent, and
(D) a hydrotalcite compound or a calcined product thereof.

32. The fluorine-containing elastomer composition according to claim 2, wherein the fluorine-containing elastomer of component (A) is a fluorine-containing elastomer which contains iodine and/or bromine to be a vulcanizing point, and which consists of (a) vinylidene fluoride units, (b) hexafluoropropylene units and 35 to 0% by weight, based on the total weight of monomer units of (a), (b) and (c), of (c) tetrafluoroethylene units, the weight ratio of (a) vinylidene fluoride units to (b) hexafluoropropylene units being in the range of 40:60 to 80:20; the organic peroxide of component (B) is at least one selected from the group consisting of 2,5-dimethyl-2,5-di(tert-butylperoxy)-hexane, dicumyl peroxide, and α,α'-bis(tert-butylperoxy-m-isopropyl)benzene; the co-vulcanizing agent of component (C) is triallyl isocyanurate; and the hydrotalcite compound of component (D) is the hydrotalcite compound represented by the structural formula:

$$[Mg_xAl_2(OH)_{2x+6-2z}]^{2Z+} (CO_3{}^{2-})_z \cdot mH_2O$$

wherein x is a positive number not lower than 2, z is a number selected from 0, 1 and 2, and m is a positive number, or the calcined material thereof.

33. The fluorine-containing elastomer composition according to claim 2, wherein the fluorine-containing elastomer of component (A) is a fluorine-containing elastomer which contains iodine and/or bromine to be a vulcanizing point, and which consists of (a) vinylidene fluoride units, (b) hexafluoropropylene units and (c) tetrafluoroethylene units; the organic peroxide of component (B) is at least one selected from the group consisting of 2,5-dimethyl-2,5-di(tert-butylperoxy)hexane, dicumyl peroxide, and α,α'-bis(tert-butylperoxy-m-isopropyl)benzene; the co-vulcanizing agent of component (C) is triallyl isocyanurate; and the hydrotalcite compound of component (D) is the hydrotalcite compound represented by the structural formula:

$$[Mg_xAl_2(OH)_{2x+6-2z}]^{2Z+} (CO_3{}^{2-})_z \cdot mH_2O$$

wherein x is a positive number not lower than 2, z is a number selected from 0, 1 and 2, and m is a positive number, or the calcined material thereof.

34. The fluorine-containing elastomer composition according to claim 2, wherein, based on 100 parts by weight of the fluorine-containing elastomer of component (A), the amount of the organic peroxide of component (B) is in the range of 0.05 to 5 parts by weight, the amount of the co-vulcanizing agent of component (C) is in the range of 0.1 to 10 parts by weight, the amount of the hydrotalcite compound of component (D) is in the range of 0.5 to 40 parts by weight.

35. A molded article made from the fluorine-containing elastomer composition according to claim 1.

36. A molded article made from the fluorine-containing elastomer composition according to claim 32.

37. A molded article made from the fluorine-containing elastomer composition according to claim 33.

38. A laminate which comprises a metal, a resin, an elastomer or a fiber and the cured product of the fluorine-containing elastomer composition according to claim 1, which are laminated with an adhesive cured by vulcanization.

39. A laminate which comprises a metal, a resin, an elastomer or a fiber and the cured product of the fluorine-containing elastomer composition according to claim 32, which are laminated with an adhesive cured by vulcanization.

40. A laminate which comprises a metal, a resin, an elastomer or a fiber and the cured product of the fluorine-containing elastomer composition according to claim 33, which are laminated with an adhesive cured by vulcanization.

41. The molded article according to claim 35, which is an O-ring.

42. The molded article according to claim 35, which is a gasket.

43. The laminate according to claim 38, which is an oil-seal.

* * * * *